United States Patent Office 3,017,157
Patented Jan. 16, 1962

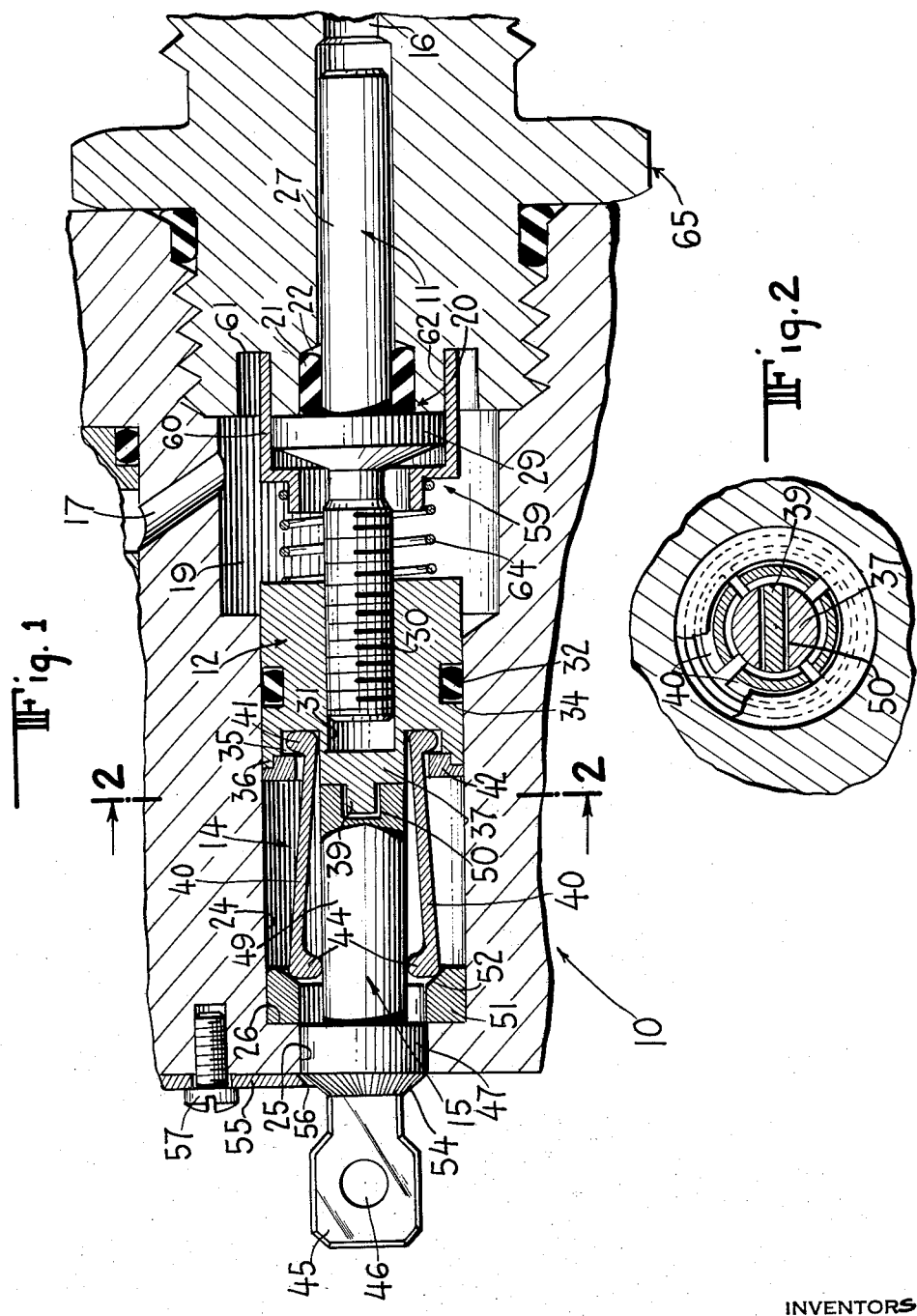

3,017,157
LANYARD ACTUATED VALVE
Floyd B. Parsons, Ridgewood, and Joseph L. Then, Irvington, N.J., assignors to Specialties Development Corporation, Belleville, N.J., a corporation of New Jersey
Filed Feb. 11, 1960, Ser. No. 8,092
10 Claims. (Cl. 251—66)

The present invention relates to valves, and, more particularly, to an improved valve adapted to be operated by a pull cord or lanyard.

There are many types of apparatus which are operated in emergencies by fluid under pressure controlled by a valve. Numerous tests have proven, that in a state of emergency, persons panic in various degrees and cannot perform certain required operations even though quite simple. However, it has been found that persons in panic can instinctively perform an operation which requires pulling a cord. Consequently, valves have been developed for emergency apparatus which are so operated.

Heretofore, such valves had one or more disadvantages. In some cases, the valve actuating device was not reliable, the valve had leakage problems, and/or full flow communication was not established within the time required.

Accordingly, an object of the present invention is to provide an improved lanyard actuated valve which is not subject to the foregoing disadvantages.

Another object is to provide such a valve which is readily adjusted to position the elements thereof to close a port and wherein means are provided to lock the elements in their adjusted position to prevent displacement thereof due to shock or vibration.

A further object is to provide such a valve which is simple and economical in construction and is practical and reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing forming a part of the specification, wherein:

FIG. 1 is a fragmentary, longitudinal, sectional view of a valve in accordance with the present invention.

FIG. 2 is a sectional view taken along the line 2—2 on FIG. 1 illustrating details of the valve.

Referring to the drawing in detail, a valve is shown which generally comprises a valve body 10, a valve member 11, a piston 12, latching means 14, and a plunger 15 cooperating with the latching means and the piston as will be described hereinafter.

The valve body 10 has an inlet 16 in communication with a source of fluid under pressure (not shown) an outlet 17 for delivering the fluid to a point of use, and a valve chamber 19 and a port 20 provided by an O-ring 21 seated and fitting snugly in a recess 22 disposed between the inlet and the outlet. The valve body further has a bore or cylinder 24 which preferably is concentric with the inlet 16 and the valve chamber 19 and faces the valve chamber. The cylinder 24 is formed with a restricted opening 25 extending outwardly to the exterior of the valve body into which the plunger 15 is inserted, and the opening is surrounded by a shoulder 26.

The valve member 11 has a stem 27 extending into the inlet 16 and fitting into the O-ring 21 to form a seal to close the valve, a flange 29 abutting the O-ring 21, and a screw threaded stem 30 rotatably secured in a screw threaded bore 31 formed in the piston 12.

The piston 12 is slidably mounted in the cylinder 24, and an O-ring 32 is disposed in a recess 34 between the ends of the piston to provide a seal between the piston and the cylinder wall. At the end of the piston which faces the opening 25, the piston is formed with an annular recess 35, a stepped tubular portion 36 surrounding the recess 35, and a central stud 37 provided with a diametrically extending tongue or projection 39.

The latching means 14 comprises a plurality of circumferentially arranged fingers or jaws 40, for example four as shown (FIG. 2), having a knob 41 at one end seated in the recess 35 and retained therein by a ring 42 permanently secured to the tubular portion 36 of the piston to pivotally mount the fingers on the piston for movement in a radial direction. The other end of each finger has a knob 44 thereon, the purpose of which is about to be described.

The plunger 15 comprises a head 45 disposed outwardly of the opening 25 having a radially extending aperture 46 for receiving a lanyard for retracting the plunger or receiving a tool for rotating the plunger, an enlarged portion 47 fitted into the opening 25, and a cylindrical section 49 extending into the cylinder 24 formed with a diametrically extending slot 50 at its inner end into which the tongue 39 extends to connect the piston 12 to the plunger for rotation therewith.

A ring 51, seated on the shoulder 26 at the inner end of the opening 25 and secured to the cylinder 14, is formed with a cam surface 52 which extends radially inwardly and outwardly towards the opening 25. This cam surface is engaged by the knobs 44 of the fingers, and when the plunger is retracted, the cam surface guides the fingers radially inwardly so that they can pass through the ring 51 and the opening 25 to unlatch the piston 12. When the plunger is inserted as shown, the knobs 44 engage section 49 of the plunger which is dimensioned to hold the fingers radially outwardly and in abutment with the cam surface 52.

Relative rotational movement between the valve member 11 and the piston 12 and the plunger 15 which is connected for rotation with the piston, due to shock or vibration, is prevented and the plunger 15 is retained in the cylinder 24 by providing the plunger portion 47 with a knurled tapered annular outer portion 54 which is engaged by a plate 55 secured to the valve body 10 having a point 56 extending into the knurling and overlaying the same to retain the plunger. Preferably, the plate is pivotally mounted by a screw 57 on the valve body 10 so that it can be swung away from the plunger while the valve is being assembled and adjusted, and is formed of yieldable material so that the pointed end is pushed away from the valve body wall when the plunger is retracted.

In order to prevent the O-ring 21 from being blown over the flange 29 when the valve is opened by withdrawing the O-ring from its recess 22, means are provided for trapping the O-ring between the flange 29 and port 20. Such means comprise an apertured cup-shaped member 59 slidably mounted on the stem 30 adjacent to and enclosing the flange 29 and having a sleeve portion 60 seated in an annular recess 61 surrounding the valve port 20 and closely fitting the radially inner wall 62 of the recess, and a spring 64 biased between the piston 12 and the member 59 for normally urging the sleeve portion 60 into the recess 61.

Thus, when the stem 27 and the O-ring 21 are moved towards the left (as viewed), the O-ring is moved out of its recess 21 but the sleeve 60 remains in its recess 61 for a sufficient duration so that the flow of high pressure fluid expands the O-ring and seats the expanded O-ring into the sleeve before the sleeve is entirely out of its recess.

The valve is assembled by swinging the plate 55 away from the opening 25, inserting the plunger 15 through the opening, moving the plate 55 to the position shown to retain the plunger, and inserting the fingers 40 and the piston 12 into the cylinder from the right (as viewed) to position the knobs 44 in engagement with the cam surface 52. A valve body fitting 65 which is formed with the port 20 and the recesses 22 and 61 is then screwed onto the valve body as shown.

These operations are performed with member 59 and the spring 64 assembled on the valve member 11 and the valve member threaded into the piston 12 so that the flange 29 will be spaced from the inner end wall of the fitting 65 when the latter is applied as shown and the O-ring 21 will be at least partially inserted into its recess 22. The plate 55 is again swung away from the opening 25, a tool is inserted into the aperture 46 of the plunger 15, and the plunger is turned whereby the screw threads of the piston and the valve member cooperate to move the valve member towards the right (as viewed) until the flange 29 is positioned as shown. While this is being accomplished, the stem 27 fits snugly in the O-ring 21 and the O-ring fits snugly enough in its recess 22 to prevent the valve member from turning. Thereafter, the plate 55 is returned to the position shown and a lanyard or pull cord is inserted through the aperture 46 and fastened to the head 45 of the plunger.

In operation, to open the valve, the lanyard is pulled to separate the plunger 15 from the valve body, and pressure acting on the valve member and piston assembly causes the knobs 44 of the fingers 40 to ride radially inwardly on the cam surface 52 and pass outwardly through the cam ring 51 and the opening 25, whereby the valve member and piston assembly is released and moves to the extreme left position in the cylinder 24 and valve chamber 19 (as viewed) to withdraw the stem 27 from the port 20 and fully open the valve.

The valve is reconditioned for subsequent operation by inserting the plunger 15 and pushing the piston and valve member assembly towards the right (as viewed) until the knobs 44 again engage the cam surface 52 and the flange 29 is positioned substantially as shown, and turning the plunger if necessary, to adjust the valve member.

From the foregoing description, it will be seen that the present invention provides an improved lanyard operated valve which operates automatically at once when the valve member is unlatched.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. In a valve for controlling fluid under pressure including a body having an inlet, an outlet and a port and a valve chamber between the inlet and the outlet, and a valve member for normally closing the port: a cylinder on the body facing the valve chamber formed with a restricted opening extending to the exterior of the body; a cam surface extending radially inwardly and towards said opening and surrounding said opening at the interior thereof; a piston connected to the valve member and slidably mounted in said cylinder; latch means including collapsible jaws pivotally mounted at one end on said piston and engaging said cam surface at the other end thereof; said jaws being dimensioned to pass through said restricted opening when collapsed and a retractable plunger extending inwardly through said opening into said cylinder and dimensioned to be engaged by the free end of said latch means jaws to retain said latch means jaws on said cam surface, whereby when said plunger is retracted the free ends of said latch means jaws are guided by said cam surface into and outwardly through said opening under the influence of fluid pressure acting on the valve member and the piston to open said port and establish fluid flow communication between the inlet and outlet.

2. A valve according to claim 1, wherein the valve member and said piston are connected by screw threads to adjust the position of said piston so that the free ends of said latch means jaws engage said cam surface.

3. A valve according to claim 2, wherein said piston and said plunger have inter-engaging means whereby rotation of said plunger effects rotation of said piston.

4. A valve according to claim 3, wherein said plunger has means at the outer end thereof extending outwardly of said opening adapted to be engaged by a tool to rotate said plunger.

5. A valve according to claim 4, wherein said means on said plunger is an aperture extending radially therethrough adapted to receive the tool and adapted for attaching a lanyard thereto for retracting said plunger.

6. A valve according to claim 2, wherein means are provided at the end of said plunger extending outwardly of said opening for preventing rotation of said plunger.

7. A valve according to claim 6, wherein said rotation-preventing means include a tapered surface on said plunger provided with knurling, a plate provided with a free end for engaging said knurling, and means for rotatably connecting said plate to said cylinder to swing said plate out of engagement with said knurling while said piston is being positioned by said plunger, said plate being yieldable to permit said plunger to be retracted while in engagement therewith.

8. A valve according to claim 1, wherein the port includes a recess, a sealing ring is disposed in the recess and the valve member has a stem extending through said ring and in sealing engagement therewith.

9. A valve according to claim 8, wherein the valve member has a flange overlying the port and said sealing ring and said flange is disposed in the chamber, a cup-shaped member is slidably mounted on the valve member and houses said flange, and a spring between said piston and said cup-shaped member urges said cup-shaped member towards the port.

10. A valve according to claim 9, wherein said cup-shaped member has a sleeve, and the valve body has an annular recess surrounding said port for receiving said sleeve.

References Cited in the file of this patent

UNITED STATES PATENTS

| | | |
|---|---|---|
| 785,395 | Aass | Mar. 21, 1905 |
| 2,701,116 | Roth | Feb. 1, 1955 |